(12) United States Patent
Wolrich et al.

(10) Patent No.: US 7,418,571 B2
(45) Date of Patent: Aug. 26, 2008

(54) MEMORY INTERLEAVING

(75) Inventors: Gilbert Wolrich, Framingham, MA (US); Mark B. Rosenbluth, Uxbridge, MA (US); Matthew J. Adiletta, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 11/112,047

(22) Filed: Apr. 22, 2005

(65) Prior Publication Data

US 2005/0185437 A1  Aug. 25, 2005

Related U.S. Application Data

(62) Division of application No. 10/340,220, filed on Jan. 10, 2003, now Pat. No. 6,941,438.

(51) Int. Cl.
G06F 12/00 (2006.01)
(52) U.S. Cl. ........................ 711/202; 711/157
(58) Field of Classification Search ........................ None
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,792,441 A | 2/1974 | Wymore et al. | |
| 3,881,173 A | 4/1975 | Larsen et al. | |
| 3,913,074 A | 10/1975 | Homberg et al. | |
| 3,940,745 A | 2/1976 | Sajeva | |
| 4,023,023 A | 5/1977 | Bourrez et al. | |
| 4,045,782 A | 8/1977 | Anderson et al. | |
| 4,130,890 A | 12/1978 | Adam | |
| 4,189,767 A | 2/1980 | Ahuja | |
| 4,392,758 A | 7/1983 | Bowles et al. | |
| 4,400,770 A | 8/1983 | Chan et al. | |
| 4,514,807 A | 4/1985 | Nogi | |
| 4,523,272 A | 6/1985 | Fukunaga et al. | |
| 4,569,016 A | 2/1986 | Hao et al. | |
| 4,724,521 A | 2/1988 | Carron et al. | |
| 4,742,451 A | 5/1988 | Bruckert et al. | |
| 4,745,544 A | 5/1988 | Renner et al. | |
| 4,777,587 A | 10/1988 | Case et al. | |
| 4,833,657 A | 5/1989 | Tanaka | |

(Continued)

FOREIGN PATENT DOCUMENTS

EP     0 379 709     8/1990

(Continued)

OTHER PUBLICATIONS

"Hart, Field Communications Protocol, Application Guide", 'Online! 1999, Hart Communication Foundation, Austin, TX, XP002219606, http://lhc-div.web.cern.ch/lhc-div/IAS/WS/WorldFip/Labo/ap-pguide.pdf, 79 pages.

(Continued)

Primary Examiner—Reginald Bragdon
Assistant Examiner—Ngoc Dinh
(74) Attorney, Agent, or Firm—Fish & Richardson P.C.

(57) ABSTRACT

Memory interleaving includes providing a non-power of two number of channels in a computing system and interleaving memory access among the channels.

16 Claims, 8 Drawing Sheets

U.S. PATENT DOCUMENTS

| | | |
|---|---|---|
| 4,866,664 A | 9/1989 | Burkhardt, Jr. et al. |
| 4,868,735 A | 9/1989 | Moller et al. |
| 4,992,934 A | 2/1991 | Portanova et al. |
| 5,008,808 A | 4/1991 | Fries et al. |
| 5,073,864 A | 12/1991 | Methvin et al. |
| 5,113,516 A | 5/1992 | Johnson |
| 5,140,685 A | 8/1992 | Sipple et al. |
| 5,142,676 A | 8/1992 | Fried et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,165,025 A | 11/1992 | Lass |
| 5,166,872 A | 11/1992 | Weaver et al. |
| 5,168,555 A | 12/1992 | Byers et al. |
| 5,173,897 A | 12/1992 | Schrodi et al. |
| 5,247,671 A | 9/1993 | Adkins et al. |
| 5,255,239 A | 10/1993 | Taborn et al. |
| 5,263,169 A | 11/1993 | Genusov et al. |
| 5,274,770 A | 12/1993 | Yeoh et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,428,809 A | 6/1995 | Coffin et al. |
| 5,432,918 A | 7/1995 | Stamm |
| 5,436,626 A | 7/1995 | Fujiwara et al. |
| 5,442,756 A | 8/1995 | Grochowski et al. |
| 5,448,702 A | 9/1995 | Garcia, Jr. et al. |
| 5,450,351 A | 9/1995 | Heddes |
| 5,450,603 A | 9/1995 | Davies |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,481,683 A | 1/1996 | Karim |
| 5,487,159 A | 1/1996 | Byers et al. |
| 5,517,628 A | 5/1996 | Morrison et al. |
| 5,517,648 A | 5/1996 | Bertone et al. |
| 5,541,920 A | 7/1996 | Angle et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,606,676 A | 2/1997 | Grochowski et al. |
| 5,610,864 A | 3/1997 | Manning |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,640,538 A | 6/1997 | Dyer et al. |
| 5,644,623 A | 7/1997 | Gulledge |
| 5,649,109 A | 7/1997 | Griesmer et al. |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,701,435 A | 12/1997 | Chi |
| 5,717,760 A | 2/1998 | Satterfield |
| 5,717,898 A | 2/1998 | Kagan et al. |
| 5,721,870 A | 2/1998 | Matsumoto |
| 5,724,563 A | 3/1998 | Hasegawa |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,790,813 A | 8/1998 | Whittaker |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,799 A | 9/1998 | Zuravleff et al. |
| 5,812,839 A | 9/1998 | Hoyt et al. |
| 5,812,868 A | 9/1998 | Moyer et al. |
| 5,813,031 A | 9/1998 | Chou et al. |
| 5,815,714 A | 9/1998 | Shridhar et al. |
| 5,819,080 A | 10/1998 | Dutton et al. |
| 5,828,746 A | 10/1998 | Ardon |
| 5,828,863 A | 10/1998 | Barrett et al. |
| 5,829,033 A | 10/1998 | Hagersten et al. |
| 5,832,215 A | 11/1998 | Kato et al. |
| 5,832,258 A | 11/1998 | Kiuchi et al. |
| 5,835,755 A | 11/1998 | Stellwagen, Jr. |
| 5,835,928 A | 11/1998 | Auslander et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,951,679 A | 9/1999 | Anderson et al. |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,978,874 A | 11/1999 | Singhal et al. |
| 5,983,274 A | 11/1999 | Hyder et al. |
| 5,996,068 A | 11/1999 | Dwyer, III et al. |
| 6,002,881 A | 12/1999 | York et al. |
| 6,009,505 A | 12/1999 | Thayer et al. |
| 6,009,515 A | 12/1999 | Steele, Jr. |
| 6,012,151 A | 1/2000 | Mano |
| 6,014,729 A | 1/2000 | Lannan et al. |
| 6,023,742 A | 2/2000 | Ebeling et al. |
| 6,029,170 A | 2/2000 | Garger et al. |
| 6,029,228 A | 2/2000 | Cai et al. |
| 6,047,334 A | 4/2000 | Langendorf et al. |
| 6,058,168 A | 5/2000 | Braband |
| 6,058,465 A | 5/2000 | Nguyen |
| 6,067,585 A | 5/2000 | Hoang |
| 6,070,231 A | 5/2000 | Ottinger |

| | | | |
|---|---|---|---|
| 6,072,781 A | 6/2000 | Feeney et al. | |
| 6,073,215 A | 6/2000 | Snyder | |
| 6,076,129 A | 6/2000 | Fenwick et al. | |
| 6,076,158 A | 6/2000 | Sites et al. | |
| 6,079,008 A | 6/2000 | Clery, III | |
| 6,079,014 A | 6/2000 | Papworth et al. | |
| 6,085,215 A | 7/2000 | Ramakrishnan et al. | |
| 6,085,294 A | 7/2000 | Van Doren et al. | |
| 6,088,783 A | 7/2000 | Morton | |
| 6,092,127 A | 7/2000 | Tausheck | |
| 6,092,158 A | 7/2000 | Harriman et al. | |
| 6,092,175 A | 7/2000 | Levy et al. | |
| 6,112,016 A | 8/2000 | MacWilliams et al. | |
| 6,115,811 A | 9/2000 | Steele, Jr. | |
| 6,134,665 A | 10/2000 | Klein et al. | |
| 6,141,348 A | 10/2000 | Muntz | |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehrotra et al. | |
| 6,145,123 A | 11/2000 | Torrey et al. | |
| 6,157,955 A | 12/2000 | Narad et al. | |
| 6,160,562 A | 12/2000 | Chin et al. | |
| 6,173,349 B1 | 1/2001 | Qureshi et al. | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,602 B1 | 4/2001 | Wicki et al. | |
| 6,212,604 B1 | 4/2001 | Tremblay | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,277 B1 | 4/2001 | Karguth | |
| 6,223,279 B1 | 4/2001 | Nishimura et al. | |
| 6,230,119 B1 | 5/2001 | Mitchell | |
| 6,230,261 B1 | 5/2001 | Henry et al. | |
| 6,233,599 B1 | 5/2001 | Nation et al. | |
| 6,247,025 B1 | 6/2001 | Bacon | |
| 6,247,040 B1 | 6/2001 | Born et al. | |
| 6,247,086 B1 | 6/2001 | Allingham | |
| 6,249,829 B1 | 6/2001 | Bloks et al. | |
| 6,256,713 B1 | 7/2001 | Audityan et al. | |
| 6,272,616 B1 | 8/2001 | Fernando et al. | |
| 6,275,505 B1 | 8/2001 | O Loughlin et al. | |
| 6,278,289 B1 | 8/2001 | Guccione et al. | |
| 6,279,113 B1 | 8/2001 | Vaidya | |
| 6,289,011 B1 | 9/2001 | Seo et al. | |
| 6,298,370 B1 | 10/2001 | Tang et al. | |
| 6,307,789 B1 | 10/2001 | Wolrich et al. | |
| 6,311,256 B2 | 10/2001 | Halligan et al. | |
| 6,324,624 B1 | 11/2001 | Wolrich et al. | |
| 6,345,334 B1 | 2/2002 | Nakagawa et al. | |
| 6,347,344 B1 | 2/2002 | Baker et al. | |
| 6,351,808 B1 | 2/2002 | Joy et al. | |
| 6,356,962 B1 | 3/2002 | Kasper et al. | |
| 6,357,016 B1 | 3/2002 | Rodgers et al. | |
| 6,360,262 B1 | 3/2002 | Guenthner et al. | |
| 6,366,978 B1 | 4/2002 | Middleton et al. | |
| 6,373,848 B1 | 4/2002 | Allison et al. | |
| 6,378,124 B1 | 4/2002 | Bates et al. | |
| 6,381,668 B1 * | 4/2002 | Lunteren | 711/5 |
| 6,389,449 B1 | 5/2002 | Nemirovsky et al. | |
| 6,393,483 B1 | 5/2002 | Latif et al. | |
| 6,401,149 B1 | 6/2002 | Dennin et al. | |
| 6,408,325 B1 | 6/2002 | Shaylor | |
| 6,415,338 B1 | 7/2002 | Habot | |
| 6,426,940 B1 | 7/2002 | Seo et al. | |
| 6,427,196 B1 | 7/2002 | Adiletta et al. | |
| 6,430,626 B1 | 8/2002 | Witkowski et al. | |
| 6,430,646 B1 | 8/2002 | Thusoo et al. | |
| 6,434,145 B1 | 8/2002 | Opsasnick et al. | |
| 6,449,289 B1 | 9/2002 | Quicksall | |
| 6,457,078 B1 | 9/2002 | Magro et al. | |
| 6,463,072 B1 | 10/2002 | Wolrich et al. | |
| 6,480,943 B1 * | 11/2002 | Douglas et al. | 711/157 |
| 6,490,642 B1 | 12/2002 | Thekkath et al. | |
| 6,496,925 B1 | 12/2002 | Rodgers et al. | |
| 6,505,229 B1 | 1/2003 | Turner et al. | |
| 6,505,281 B1 | 1/2003 | Sherry | |
| 6,513,089 B1 | 1/2003 | Hofmann et al. | |
| 6,523,108 B1 | 2/2003 | James et al. | |
| 6,529,999 B1 | 3/2003 | Keller et al. | |
| 6,532,509 B1 | 3/2003 | Wolrich et al. | |
| 6,539,439 B1 | 3/2003 | Nguyen et al. | |
| 6,552,826 B2 | 4/2003 | Adler et al. | |
| 6,560,667 B1 | 5/2003 | Wolrich et al. | |
| 6,570,877 B1 | 5/2003 | Kloth et al. | |
| 6,577,542 B2 | 6/2003 | Wolrich et al. | |
| 6,577,625 B1 | 6/2003 | Chiou et al. | |
| 6,581,124 B1 | 6/2003 | Anand | |
| 6,584,522 B1 | 6/2003 | Wolrich et al. | |
| 6,587,905 B1 | 7/2003 | Correale et al. | |
| 6,587,906 B2 | 7/2003 | Wolrich et al. | |
| 6,606,704 B1 | 8/2003 | Adiletta et al. | |
| 6,625,654 B1 | 9/2003 | Wolrich et al. | |
| 6,628,652 B1 | 9/2003 | Chrin et al. | |
| 6,629,237 B2 | 9/2003 | Wolrich et al. | |
| 6,631,430 B1 | 10/2003 | Wolrich et al. | |
| 6,631,462 B1 | 10/2003 | Wolrich et al. | |
| 6,633,938 B1 | 10/2003 | Rowlands et al. | |
| 6,643,726 B1 | 11/2003 | Patkar et al. | |
| 6,654,836 B1 | 11/2003 | Misra et al. | |
| 6,661,794 B1 | 12/2003 | Wolrich et al. | |
| 6,661,795 B1 | 12/2003 | Adas et al. | |
| 6,667,920 B2 | 12/2003 | Wolrich et al. | |
| 6,668,311 B2 | 12/2003 | Hooper et al. | |
| 6,668,317 B1 | 12/2003 | Bernstein et al. | |
| 6,671,761 B2 | 12/2003 | Kim | |
| 6,671,827 B2 | 12/2003 | Guilford et al. | |
| 6,678,248 B1 | 1/2004 | Haddock et al. | |
| 6,681,300 B2 | 1/2004 | Wolrich et al. | |
| 6,684,361 B2 * | 1/2004 | Tong et al. | 714/756 |
| 6,694,380 B1 | 2/2004 | Wolrich et al. | |
| 6,697,923 B2 | 2/2004 | Chen et al. | |
| 6,724,767 B1 | 4/2004 | Chong et al. | |
| 6,725,313 B1 | 4/2004 | Wingard et al. | |
| 6,728,845 B2 | 4/2004 | Adiletta et al. | |
| 6,738,831 B2 | 5/2004 | Wolrich et al. | |
| 6,754,662 B1 | 6/2004 | Li | |
| 6,754,795 B2 | 6/2004 | Chen et al. | |
| 6,781,992 B1 | 8/2004 | Rana et al. | |
| 6,785,843 B1 | 8/2004 | McRae et al. | |
| 6,823,399 B2 | 11/2004 | Horiguchi et al. | |
| 6,826,180 B1 | 11/2004 | Bergantino et al. | |
| 6,847,645 B1 | 1/2005 | Potter et al. | |
| 6,868,476 B2 | 3/2005 | Rosenbluth et al. | |
| 6,889,319 B1 | 5/2005 | Rodgers et al. | |
| 6,941,438 B2 | 9/2005 | Wolrich et al. | |
| 6,958,973 B1 | 10/2005 | Chen et al. | |
| 7,028,118 B2 * | 4/2006 | Smith et al. | 710/113 |
| 7,051,329 B1 | 5/2006 | Boggs et al. | |
| 7,089,379 B1 * | 8/2006 | Sharma et al. | 711/157 |
| 7,216,204 B2 | 5/2007 | Rosenbluth et al. | |
| 7,225,281 B2 | 5/2007 | Rosenbluth et al. | |
| 7,246,197 B2 | 7/2007 | Rosenbluth et al. | |
| 2001/0043614 A1 | 11/2001 | Viswanadham et al. | |
| 2002/0053017 A1 | 5/2002 | Adiletta et al. | |
| 2002/0056037 A1 | 5/2002 | Wolrich et al. | |
| 2003/0012198 A1 | 1/2003 | Kaganoi et al. | |
| 2003/0041216 A1 | 2/2003 | Rosenbluth et al. | |
| 2003/0041228 A1 | 2/2003 | Rosenbluth et al. | |
| 2003/0046488 A1 | 3/2003 | Rosenbluth et al. | |
| 2003/0065862 A1 | 4/2003 | Wyland | |

| | | | |
|---|---|---|---|
| 2003/0078950 | A1 | 4/2003 | Abernathy et al. |
| 2003/0105899 | A1 | 6/2003 | Rosenbluth et al. |
| 2003/0145155 | A1 | 7/2003 | Wolrich et al. |
| 2003/0145159 | A1 | 7/2003 | Adiletta et al. |
| 2003/0191866 | A1 | 10/2003 | Wolrich et al. |
| 2004/0034743 | A1 | 2/2004 | Wolrich et al. |
| 2004/0039895 | A1 | 2/2004 | Wolrich et al. |
| 2004/0054880 | A1 | 3/2004 | Bernstein et al. |
| 2004/0071152 | A1 | 4/2004 | Wolrich et al. |
| 2004/0073728 | A1 | 4/2004 | Wolrich et al. |
| 2004/0073778 | A1 | 4/2004 | Adiletta et al. |
| 2004/0098496 | A1 | 5/2004 | Wolrich et al. |
| 2004/0109369 | A1 | 6/2004 | Wolrich et al. |
| 2004/0139290 | A1 | 7/2004 | Wolrich et al. |
| 2004/0205747 | A1 | 10/2004 | Bernstein et al. |
| 2005/0132132 | A1 | 6/2005 | Rosenbluth et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| EP | 0 953 897 | 11/1999 |
| EP | 1 191 445 | 3/2002 |
| JP | 59111533 | 6/1984 |
| WO | WO 94/15287 | 7/1994 |
| WO | WO 97/38372 | 10/1997 |
| WO | WO 00/33195 | 6/2000 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

"Intel IXP1200 Network Processor Family", Hardware Reference Manual, 272 pages (Dec. 2001).

"IXP1200 Network Processor", Data Sheet, 144 pages (Mar. 2000).

*C-5 Network Processor Architecture Guide*, C-Port Corporation, Freescale Semiconductor, Inc., Part No. C5NPD0-AG/D, May 31, 2001, 642 pages.

Chang, Shu-Ping et al., "An Overview of the Pipelined Common Buffer Architecture (PCBA) for Memory Based Packet/Cell Switching Systems", *IEEE*, pp. 288-297 (1994).

Frazier, Gregory L. et al., "The Design and Implementation of a Multi-Queue Buffer For VLSI Communication Switches", *IEEE*, pp. 466-471 (1989).

Lin, Yu-Sheng et al., "Queue Management for Shared Buffer and Shared Multi-buffer ATM Switches", *IEEE*, pp. 688-695 (1996).

Romilly Bowden, "What is Hart?," Romilly's Hart and Fieldbus Web Site, Online!, 1977, XP002219605, http://www.romilly.co.uk/whathart.htm.

Agarwal et al., "April: A Processor Architecture for Multiprocessing," Proceedings of the 17th Annual International Symposium on Computer Architecutre, IEEE, pp. 104-114, (May 1990).

Chang et al., "Branch Classification: A New Mechanism For Improving Branch Predictor Performance," IEEE, pp. 22-31 (1994).

Farkas et al., "The multicluster architecture: reducing cycle time through partitioning," IEEE, vol. 30, Dec. 1997, pp. 149-159.

Hennessy et al., "Computer Organization and Design: The Hardware/Software Interface," Morgan Kaufman Publishers, 1998, pp. 116-119, 181-182, 225-227, 466-470, 476-482, 510-519, 712.

Intel, "IA-64 Application Developer's Architecture Guide," Rev.1.0, May 1999, pp. 2-2, 4-29 to 4-31, 7-116 to 7-118 and c-21.

Keckler et al., "Exploiting fine grain thread level parallelism on the MIT multi-ALU processor," IEEE, Jun. 1998.

Mendelson A. et al., "Design Alternatives of Multithreaded Architecture", *International Journal of Parallel Programming*, Plenum Press, New York, 27(3):161-193, Jun. 1999.

Paver et al., "Register Locking in Asynchronous Processor Computer Design: VLSI Processors," ICCD '92 Proceedings, IEEE 1992 International Conference, 1992, pp. 351-355.

Wadler, "The Concatenate Vanishes," University of Glasgow, Dec. 1987 (revised Nov. 1989), pp. 1-7.

Waldspurger et al., "Register Relocation: Flexible Contents for Multithreading," Proceedings of the 20th Annual International Symposium on Computer Architecture, 1993, pp. 120-130.

U.S. Appl. No. 09/475,614, filed Dec. 30, 1999, Wolrich et al.

U.S. Appl. No. 09/473,571, filed Dec. 28, 1999, Wolrich et al.

Byrd et al., "Multithread Processor Architectures," *IEEE Spectrum*, vol. 32, No. 8, New York, Aug. 1, 1995, pp. 38-46.

Doyle et al., *Microsoft Press Computer Dictionary*, 2nd ed., Microsoft Press, Redmond, Washington, USA, 1994, p. 326.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with reconfigurable coprocessor," Proceedings of the 5th Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al., "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

* cited by examiner

MEMORY INTERLEAVING

CROSS-REFERENCE TO RELATED APPLICATIONS

This application is a divisional application of and claims the benefit of priority to U.S. patent application Ser. No. 10/340,220, filed Jan. 10, 2003, now U.S. Pat. No. 6,941,438; the disclosure of the prior application is considered part of (and is incorporated by reference in) the disclosure of this application.

BACKGROUND

A channel generally refers to a pathway between a computer system and other computing systems and/or other devices. Each of a computing system's channels is an independent unit that can transfer data at the same time as other channels. Each channel is typically assigned a segment of memory address space and can transfer data corresponding to its assigned memory address space. In this way, the computing system's processor may access different segments of memory via different channels without idling while the memory completes an access to one segment before beginning another memory access. This type of memory access is generally called interleaving.

DESCRIPTION

Figure 1:
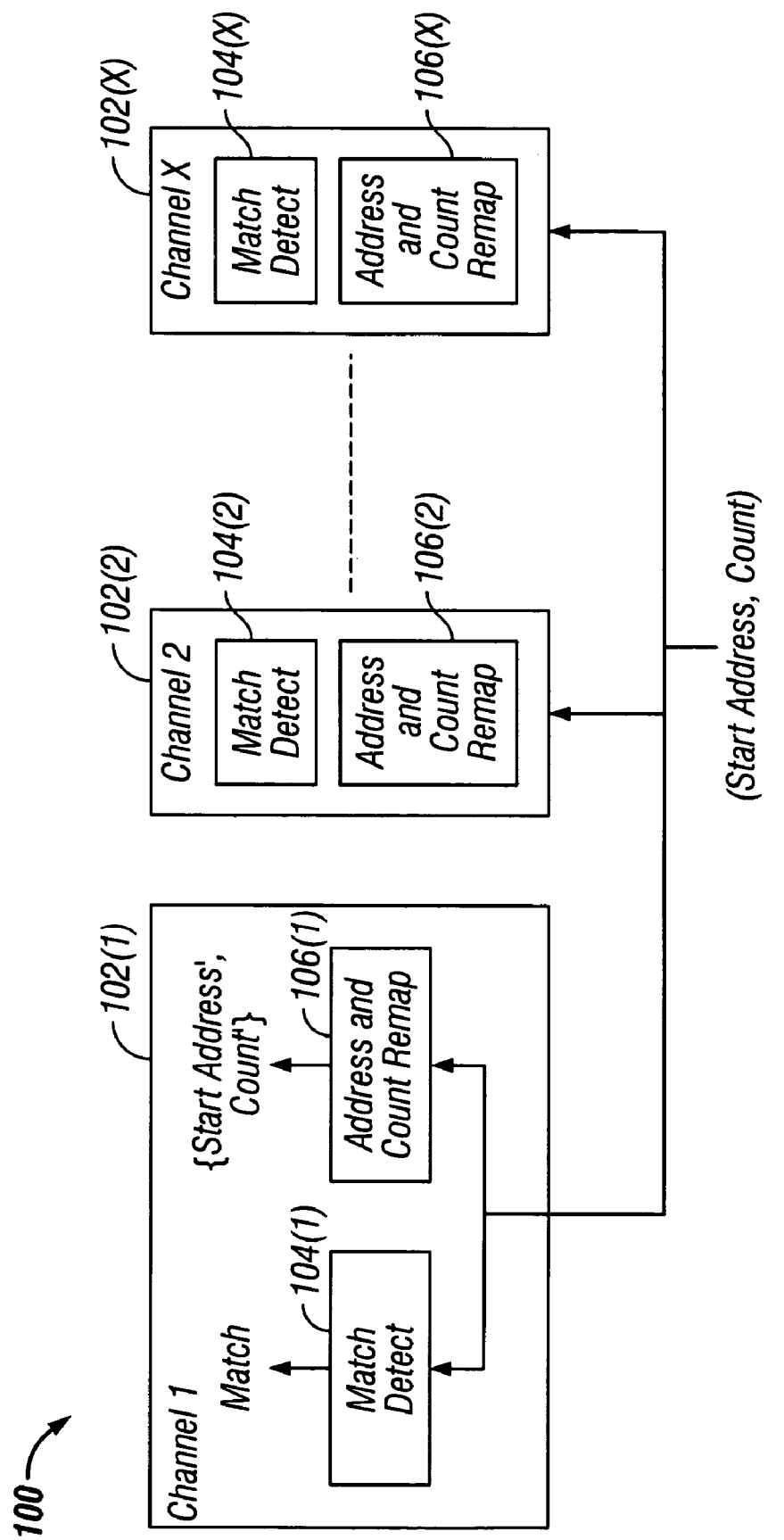
FIG. 1 is a block diagram of an example channel control system.

Referring to FIG. 1, an example channel control system 100 can interleave access to a memory using channel controllers 102(1)-102(X) each associated with one channel. X can equal any positive whole number greater than one, including non-power of two positive whole numbers (three, five, six, etc.). Whatever the value of X, interleaving may be performed without using one or more bits of a memory address to indicate which channel to use in accessing the memory. Because no address bits need to be used in channel selection, the number of channels for interleaving is not restricted to a power of two number of channels as in traditional channel interleaving. Addresses may be mapped to the channel controllers 102(1)-102(X), and accesses to the memory may be concurrently made for addresses mapped to different channels.

Each of the channel controllers 102(1)-102(X) includes one of X match detect mechanisms 104(1)-104(X) and one of X address and count remapping mechanisms 106(1)-106(X). Each of the channel controllers 102(1)-102(X) receives information regarding a region to access in a memory and determines whether its associated channel is mapped to access data included in that region. The channel controllers 102(1)-102(X) typically make their determinations in parallel although they could process the information according to some pre-programmed priority or ordering scheme.

The information received by the channel controllers 102(1)-102(X) can include a data pair including a start address indicating where to begin accessing data in the memory and a count indicating how much data to access starting at the start address. The count is typically provided in bytes although any data measurement or size indicator may be used. The start address and the count define a region beginning at the start address and extending for a number of bytes indicated by the count (or as otherwise indicated by the count depending on how the count is provided).

Each of the match detect mechanisms 104(1)-104(X) determines if its associated channel is mapped to any of the addresses included in the region. Addresses may be mapped to the channels using a traditional scheme that assigned segments of address space to channels and/or using a scheme described further below that can spread adjacent addresses over the channels such that adjacent or nearby addresses may be spread over multiple channels. The channel may be mapped to access no addresses included in the region, all addresses included in the region, or some of the addresses included in the region. If a channel is mapped to some of the addresses included in the region, then part of the region lies within the channel and at least two channels are mapped to that region and may both access the region.

If one of the match detect mechanism 104(1)-104(X) determines that part of the region lies within its associated channel, then the one of the address and count remapping mechanisms 106(1)-106(X) associated with that channel determines a remapped start address and a remapped count indicating a part of the access for its associated one of the channel controllers 102(1)-102(X) to complete. The address and count remapping mechanisms 106(1)-106(X) may determine remapped addresses and remapped counts while the match detect mechanisms 104(1)-104(X) determine which channel or channels (if any) map to the region to save on processing time.

Once the channel controllers 102(1)-102(X) have determined if their associated channels map to the region, the appropriate one or ones of the channels may access the data in indicated region. In this way, addresses may be mapped to channels such that multiple channels may be used to access data at relatively close addresses. Furthermore, an interleave scheme can include using two or more channels, including a non-power of two number of channels.

In other examples, the match detect mechanisms 104(1)-104(X) and/or the address and count remapping mechanisms 106(1)-106(X) may be external to the channel controllers 102(1)-102(X). Furthermore, some or all of the channel controllers 102(1)-102(X) may use the same one or ones of the match detect mechanisms 104(1)-104(X) and/or the address and count remapping mechanisms 106(1)-106(X).

Figure 2:
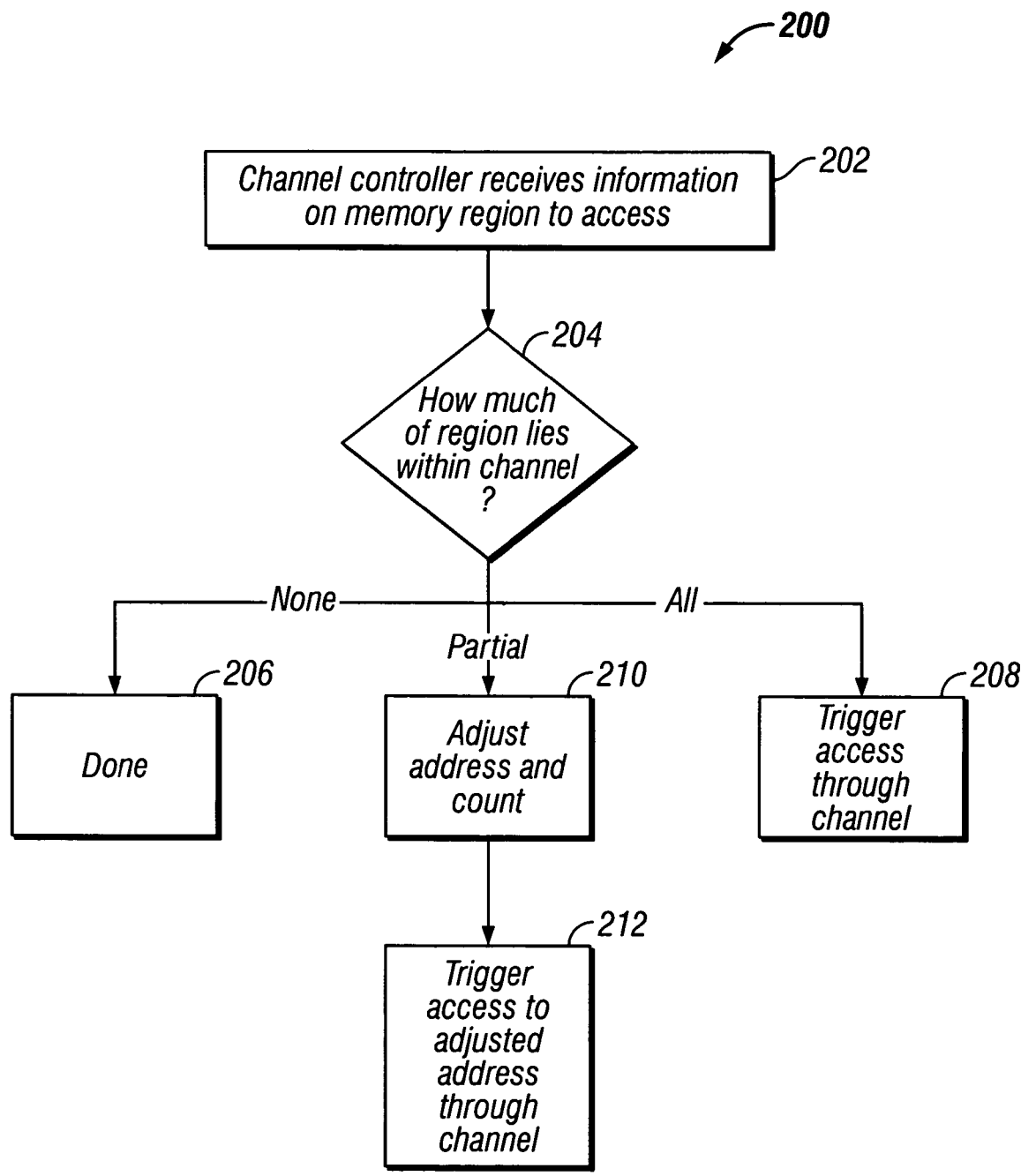
FIG. 2 is a flowchart of an example process of memory interleaving.

FIG. 2 shows an example process 200 of memory interleaving. In the process 200, the channel controller 102 receives 202 address and count information about a region to access in memory. (Each of the channel controllers 102(1)-102(X) receives the same information.)

The channel controllers 102(1)-102(X), the match detect mechanisms 104(1)-104(X), and the address and count remapping mechanisms 106(1)-106(X) each function similar to their like-named counterparts. For simplicity, the match detect mechanism 104(1) ("match detect 104") and the address and count remapping mechanism 106(1) ("remap 106") included in the channel controller 102(1) ("channel controller 102") are used as representative examples.

The match detect 104 determines 204 how much of the region lies with the channel associated with the channel controller 102, channel one in this example. An example of how the match detect 104 may make such a determination is discussed further below.

If none of the region lies within the channel, then the process 200 ends 206 because the data to be accessed cannot be accessed through that channel.

If the region lies entirely within the channel, then the channel controller 102 triggers 208 an access of an amount of data equal to the count starting at the start address through the channel. The channel controller 102 may itself retrieve the data.

If the region lies partially within the channel, then the remap 106 adjusts 210 the address and the count to an adjusted address and adjusted count so that the channel only accesses data in its assigned region. The channel controller 102 may then trigger 212 an access of an amount of data equal to the adjusted count starting at the adjusted start address through the channel. The channel controller 102 may itself retrieve the data. For example, the start address may be indexed within one channel but the count extends the region into an area mapped to another channel, and the other channel needs to adjust the start address to reflect where the region begins in its indexed area. The adjusted start address may be the same as the start address while the adjusted count differs from the count in the case where the count extends beyond a channel's mapped area.

Figure 3:
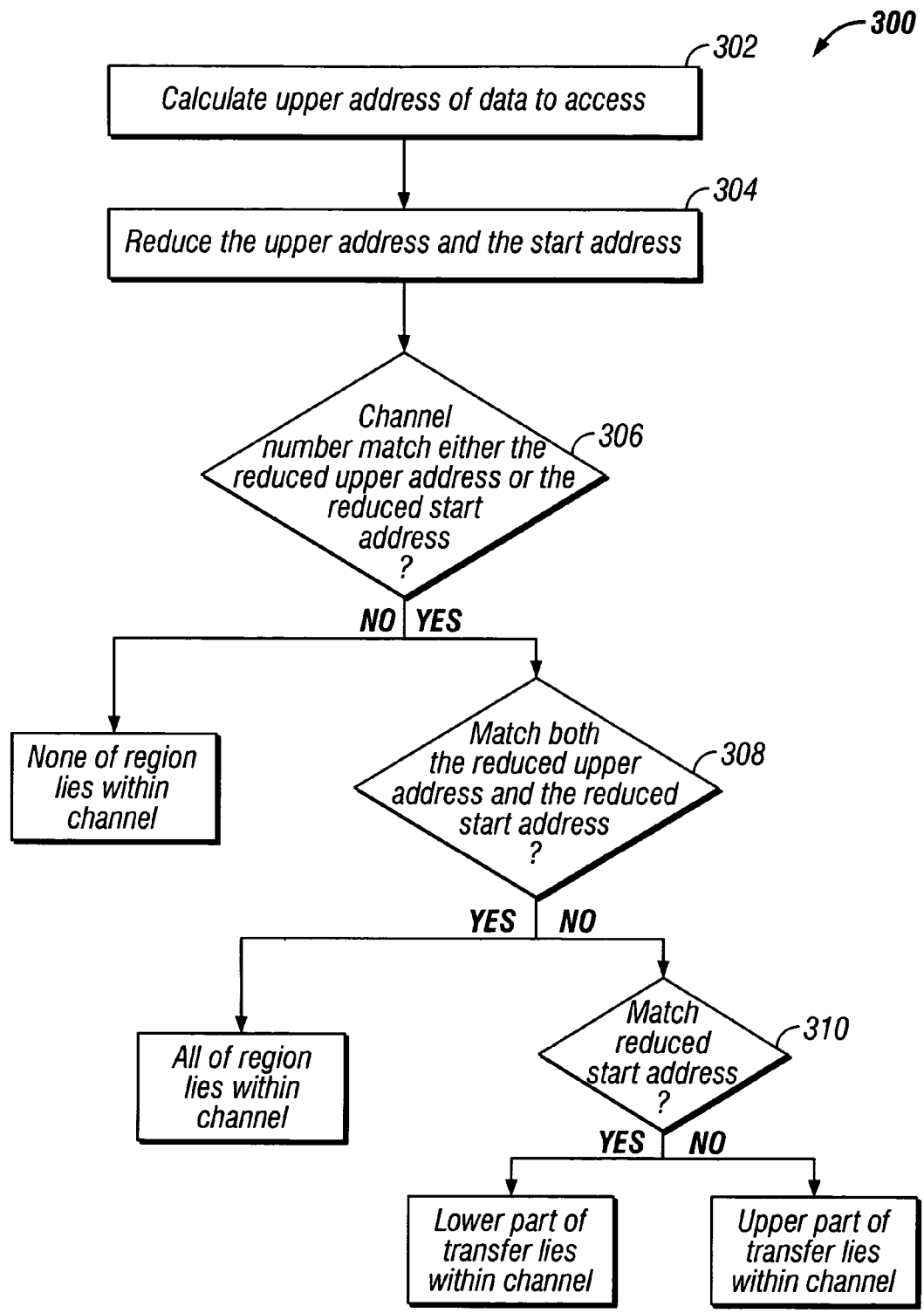
FIG. 3 is a flowchart of an example process of determining whether a region is within a channel.

FIG. 3 shows an example determination process 300 of how the match detect 104 may determine whether and how much of a region lies within a channel. In the determination process 300, the match detect 104 calculates 302 an upper address of the region corresponding to the end of the data included in the region. The match detect 104 may calculate the upper address as the start address plus the count minus one. The one is subtracted to account for the data at the start address.

The match detect 104 reduces 304 the upper address and the start address to two bits each. With the addresses reduced to two bits each, the match detect 104 can determine if the region lies at least partially within the channel associated with the match detect. The addresses may be reduced to two bits each because in an example including three channels (X equals three), each of the channels can be represented by a different two bit combination (e.g., "01" for channel one, "10" for channel two, and "11" for channel three) and the two bit representation of the channel including the address can be used in reducing the address to help determine whether the channel associated with the match detect 104 is mapped to the region. If the system includes more than three channels, the addresses may be reduced to more than two bits because more than two bits may be necessary to represent each of the different channels. An example of how the match detect 104 may perform a reduction is discussed further below.

The match detect 104 determines 306 if the channel number associated with the match detect 104 (one in this example) matches either the reduced upper address or the reduced start address. If not, then none of the region lies within the channel.

If either reduced address matches the channel number, then the match detect 104 determines 308 if both the reduced upper address and the reduced start address match the channel number. If so, then the entire region lies within the channel. If not, then only one of the reduced addresses matches the channel number and only part of the region lies within the channel. The match detect 104 determines 310 if the reduced start address matches the channel number. If so, then a lower part of the data transfer (access), a part starting at the start address, lies within the channel. If not, then the match detect 104 concludes that an upper part of the data transfer, a part starting at an address higher than the start address and continuing through the upper address (unless the starting address of the upper part is the upper address in which case the upper part of the data transfer includes only the upper address), lies within the channel. The match detect 104 in this example checks for a match with the start address and makes an assumption about an upper address match based on that determination, but the match detect 104 may check the upper address and make an assumption about the start address in other examples.

Figure 4:
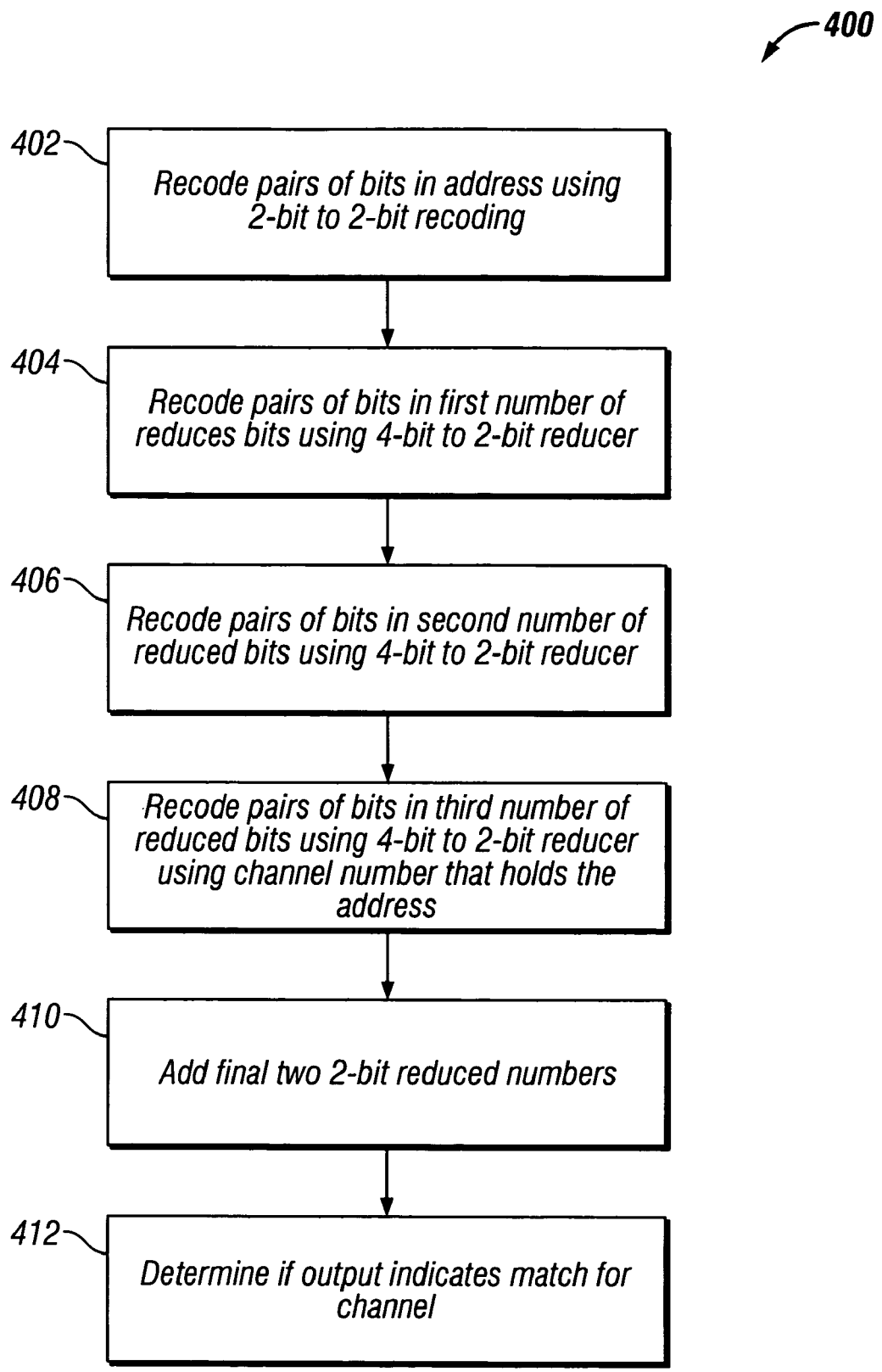
FIG. 4 is a flowchart of an example process of reducing an address.
Figure 5:
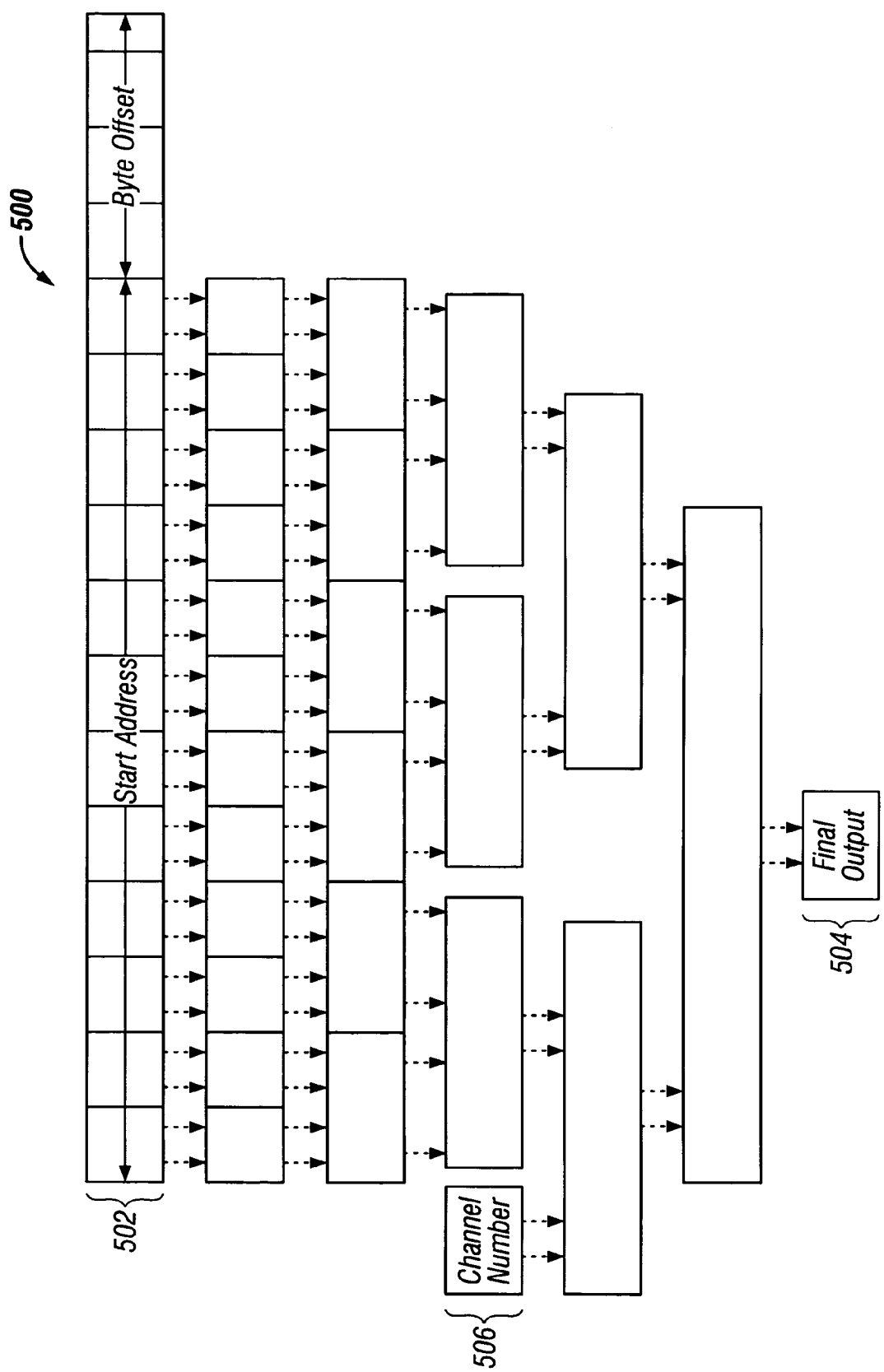
FIG. 5 is a block diagram of an example address reduction.

FIG. 4 shows an example reduction process 400 that the match detect 104 may use to reduce an address. In the reduction process 400 generally, as shown in an example address reduction 500 in FIG. 5, the match detect 104 takes five levels of gating to reduce a thirty-one bit address 502 to a two bit output number 504. The match detect 104 may ignore one or more bits included in the address 502 that are not part of the start or upper address. In this example showing a start address, the match detect 104 ignores the seven bits included in the address that represent a byte offset (the interleave byte size) and considers the twenty-four bit start address. One of the gating levels takes as an input a channel number 506 of the channel that holds the address.

Referring back to FIG. 4, the match detect 104 recodes 402 the address using 2-bit to 2-bit recoding to produce a first number of bits including as many bits as the address (twenty-four bits) according to the following table:

| Input | | Output | |
|---|---|---|---|
| n + 1 | n | 2 | 1 |
| 0 | 0 | 0 | 0 |
| 0 | 1 | 0 | 1 |
| 1 | 0 | 1 | 0 |
| 1 | 1 | 0 | 0 |

The match detect 104 reduces 404 the first number of bits using a 4-bit to 2-bit reducer to produce a second number of bits including the half as many bits as the first number of bits (twenty-four bits reduced to twelve bits) according to the following table:

| | 00 | 01 | 10 |
|---|---|---|---|
| 00 | 00 | 01 | 10 |
| | (0) | (1) | (2) |
| 01 | 01 | 10 | 00 |
| | (1) | (2) | (0) |
| 10 | 10 | 00 | 01 |
| | (2) | (0) | (1) |

The match detect 104 reduces 406 the second number of bits according to the above 4-bit to 2-bit reducer table to produce a third number of bits including half as many bits as the second number of bits (twelve bits reduced to six bits).

The match detect 104 reduces 408 the third number of bits plus the channel number including the address according to the above 4-bit to 2-bit reducer table to produce a fourth number of bits (eight bits reduced to four bits). If the match detect 104 did not include the channel number as an input in this reduction, there would be two unused inputs. The match detect 104 may receive the channel number from the remap 106, may look it up in an address mapping table that indexes addresses and their corresponding channel numbers, or may otherwise acquire the channel number.

The match detect 104 adds 410 the two resulting 2-bit recoded numbers. Sums of zero, one, and two do not change while a sum of four adds to zero. This addition produces the final two-bit output of the reduction.

The match detect 104 determines 412 if the final output indicates a match with the channel associated with the match detect 104. A final output of zero (00) indicates a match while a one (01) or a two (10) indicates a non-match. Including the channel number associated with the address (the start address or the upper address) as an input in the reduction process allows the match detect 104 to make a match determination from the final bit output of the reduction process.

Figure 6:
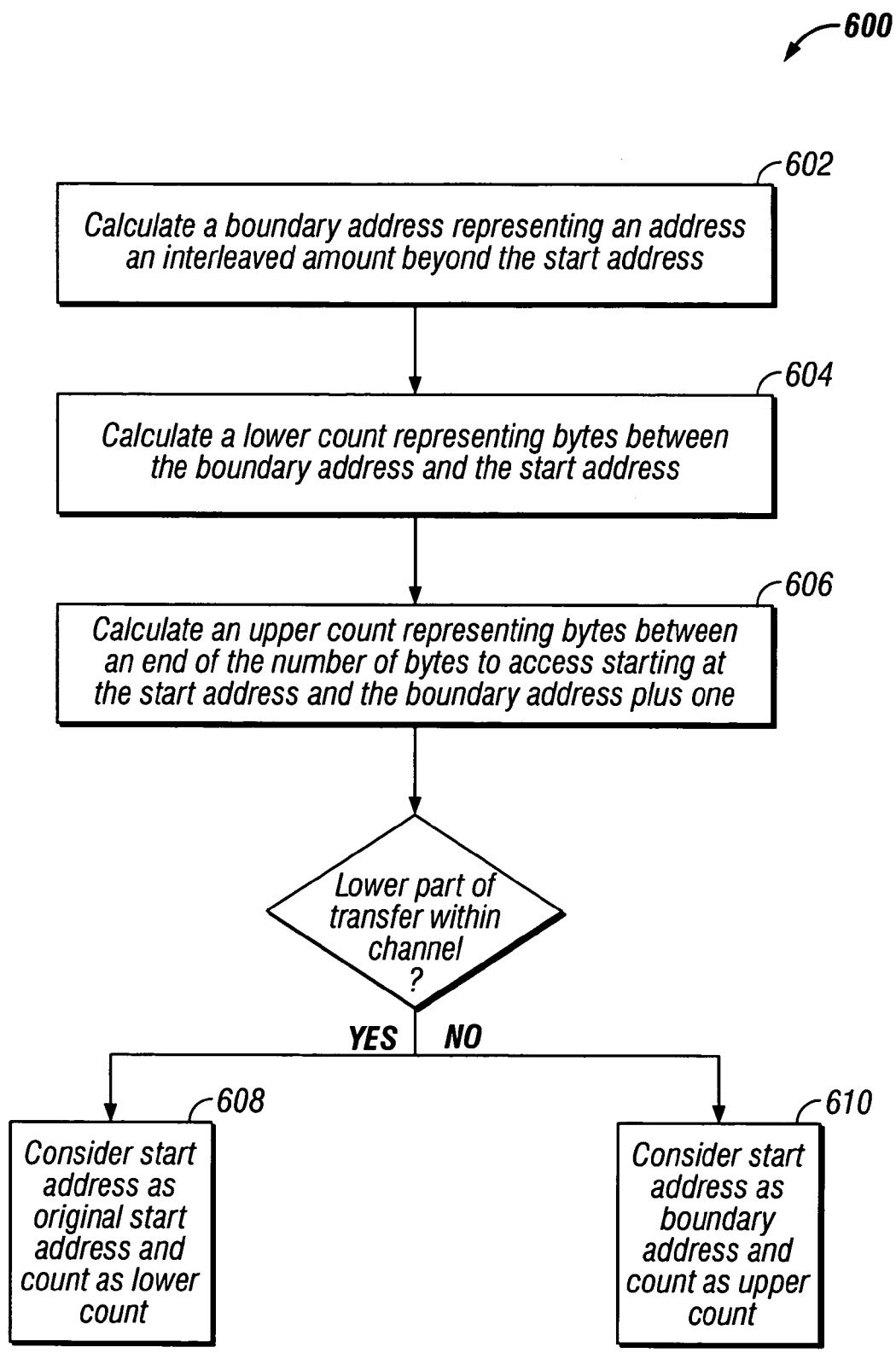
FIG. 6 is a flowchart of an example process of adjusting an address.

FIG. 6 shows an example adjustment process 600 that the remap 106 may use to adjust the start address and the count if the match detect 104 determines that only part of the region lies within its associated channel (see FIG. 2).

In the adjustment process 600, the remap 106 calculates 602 a boundary address representing an address an interleaved amount beyond the start address. The interleaved amount is typically included in the address that includes the start address (see, e.g., the address 502 in FIG. 5), and in this example equals one hundred twenty-eight bytes. The remap 106 may calculate the boundary address by performing a logical AND operation on the start address and 0xFFFFFF80 and adding 0x80 (the interleaved amount).

The remap 106 also calculates 604 a lower count representing a number of bytes between the start address and the boundary address. The remap 106 may calculate the lower count by subtracting the start address from the boundary address.

The remap 106 also calculates 606 an upper count representing a number of bytes between the boundary address and a stop address (the start address plus the count). The remap 106 may calculate the upper count by subtracting the boundary address from the stop address and adding one (the one accounts for the fact that the lower count includes the boundary address).

If the channel associated with the remap 106 owns a lower part of the transfer (e.g., as determined through the determination process 300), then the remap 106 considers 608 the adjusted start address as the start address and the adjusted count as the lower count. If not (i.e., if the channel associated with the remap 106 owns an upper part of the transfer), then the remap 106 considers 610 the adjusted start address as the boundary address and the adjusted count as the upper count.

Figure 7:
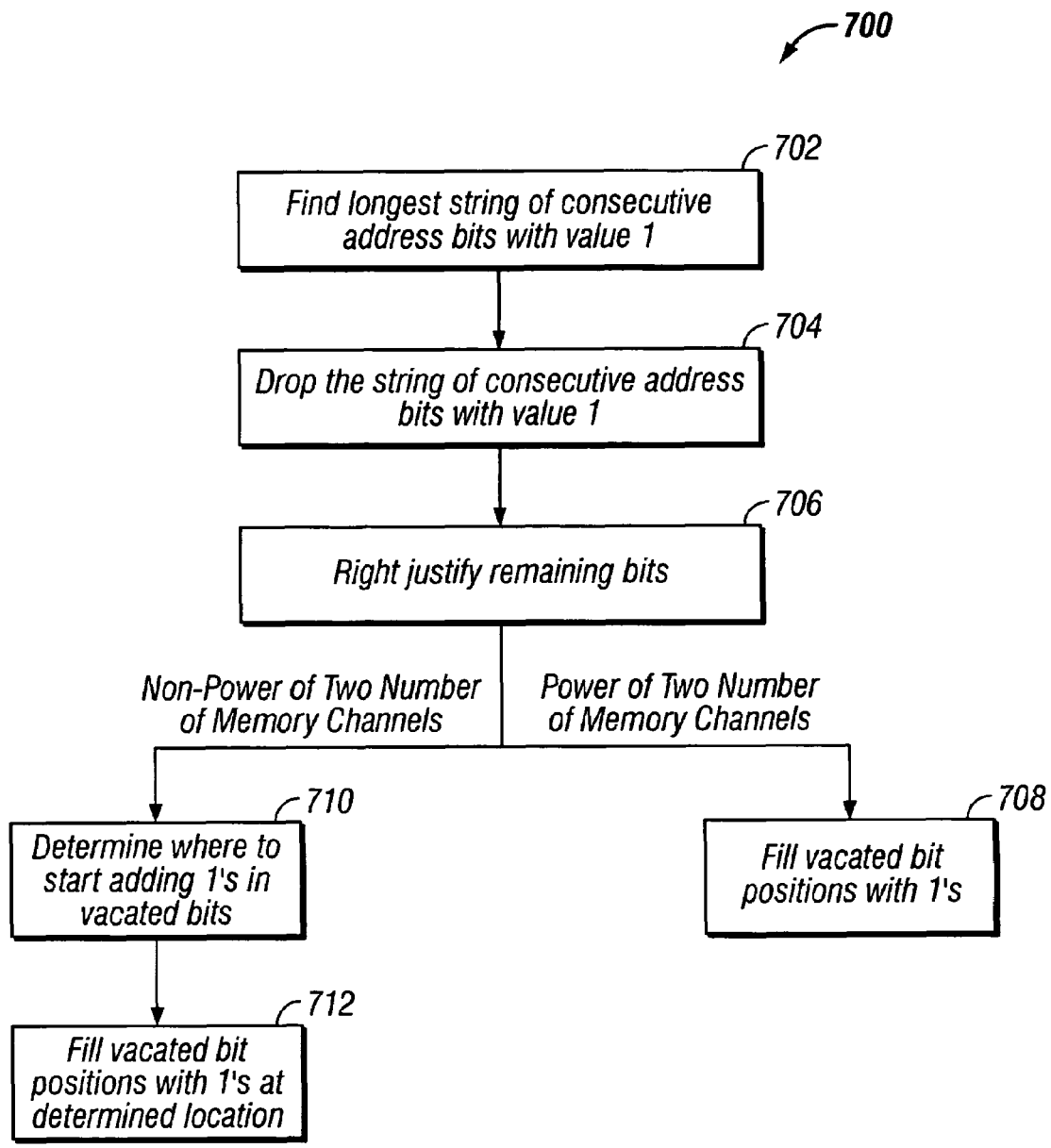
FIG. 7 is a flowchart of an example process of address remapping.

FIG. 7 shows an example remapping process 700 that the remap 106 may use to index an address within a channel. The remap 106 finds 702 a longest string of consecutive address bits with a value of one in the address to be indexed. The remap 106 may begin searching for the longest string with the least significant bit in the address. Once found, the remap 106 drops 704 the longest string from the address, right justifies 706 the remaining bits in the address. If the channel includes a power of two number of memory locations (e.g., addresses), then the remap 106 fills 708 the vacated bit positions (the most significant bits) with ones. This filling essentially adds three quarters to the remaining space of channels, e.g., starts the filling three quarters over from the address. The resulting bits form the remapped address.

If the channel is of a non-power of two, then a shifting of three quarters is not typically the same size as for a power of two channels (e.g., may not be two bit positions but some other number). The remap 106 determines 710 where to start adding ones in the vacated positions. The remap 106 may make such a determination by consulting one or more lookup tables including constants that indicate start addresses where the remap 106 may start filling 712 in ones. Each of the tables may be included in the remap 106 or be otherwise accessible to the remap 106 and may include constants for any number of channels and for any number of shifted bits. The resulting bits form the remapped address.

For example, in a three channel system, the lookup tables may be as follows, where the constant values are shown in hexadecimal format and where K0 represents three quarters of a channel, K1 represents three quarters plus three quarters of a channel K2 represents three quarters plus three quarters plus three quarters of a channel, etc. The tables show constant values up to 768 MBytes, but the values in the table may be scaled as appropriate for a larger number of MBytes.

|  | MBytes | | | | | | | |
| --- | --- | --- | --- | --- | --- | --- | --- | --- |
|  | 32 | 64 | 96 | 128 | 160 | 192 | 224 | 256 |
| K11 | N/A | N/A | N/A | N/A | N/A | N/A | N/A | N/A |
| K10 | N/A | N/A | N/A | N/A | 13FFFF | 17FFFF | 1BFFFF | 1FFFFF |
| K9 | N/A | 7FFFF | BFFFF | FFFFF | 13FFFE | 17FFFE | 1BFFFE | 1FFFFE |
| K8 | 3FFFF | 7FFFE | BFFFD | FFFFC | 13FFFB | 17FFFA | 1BFFF9 | 1FFFF8 |
| K7 | 3FFFC | 7FFF8 | BFFF4 | FFFF0 | 13FFEC | 17FFE8 | 1BFFE4 | 1FFFE0 |
| K6 | 3FFF0 | 7FFE0 | BFFD0 | FFFC0 | 13FFB0 | 17FFA0 | 1BFF90 | 1FFF80 |
| K5 | 3FFC0 | 7FF80 | BFF40 | FFF00 | 13FEC0 | 17FE80 | 1BFE40 | 1FFE00 |
| K4 | 3FF00 | 7FE00 | BFD00 | FFC00 | 13FB00 | 17FA00 | 1BF900 | 1FF800 |
| K3 | 3FC00 | 7F800 | BF400 | FF000 | 13EC00 | 17E800 | 1BE400 | 1FE000 |
| K2 | 3F000 | 7E000 | BD000 | FC000 | 13B000 | 17A000 | 1BE9000 | 1F8000 |
| K1 | 3C000 | 78000 | B4000 | F0000 | 12C000 | 168000 | 1A4000 | 1E000 |
| K0 | 30000 | 60000 | 9000 | C0000 | F0000 | 120000 | 150000 | 180000 |

|     | MBytes | | | | | | | |
| --- | --- | --- | --- | --- | --- | --- | --- | --- |
|     | 288 | 320 | 352 | 384 | 416 | 448 | 480 | 512 |
| K11 | N/A | N/A | N/A | N/A | N/A | N/A | N/A | N/A |
| K10 | 23FFFF | 27FFFF | 2BFFFF | 2FFFFF | 33FFFF | 37FFFF | 3BFFFF | 3FFFFF |
| K9  | 23FFFD | 27FFFD | 2BFFFD | 2FFFFD | 33FFFC | 37FFFC | 3BFFFC | 3FFFFC |
| K8  | 23FFF7 | 27FFF6 | 2BFFF6 | 2FFFF4 | 33FFF3 | 37FFF2 | 3BFFF1 | 3FFFF0 |
| K7  | 23FFDC | 27FFD8 | 2BFFD4 | 2FFFD0 | 33FFCC | 37FFC8 | 3BFFC4 | 3FFFC0 |
| K6  | 23FF70 | 27FF60 | 2BFF50 | 2FFF40 | 33FF30 | 37FF20 | 3BFF10 | 3FFF00 |
| K5  | 23FDC0 | 27FD80 | 2BFD40 | 2FFD00 | 33FCC0 | 37FC80 | 3BFC40 | 3FFC00 |
| K4  | 23F700 | 27F600 | 2BF500 | 2FF400 | 33F300 | 37F200 | 3BF100 | 3FF000 |
| K3  | 23DC00 | 27D800 | 2BD400 | 2FD000 | 33CC00 | 37C800 | 3BC400 | 3FC000 |
| K2  | 237000 | 276000 | 2B5000 | 2F4000 | 333000 | 372000 | 3B1000 | 3F0000 |
| K1  | 21C000 | 258000 | 294000 | 2D0000 | 30C000 | 348000 | 384000 | 3C0000 |
| K0  | 1B0000 | 1E0000 | 210000 | 240000 | 270000 | 2A0000 | 2D0000 | 300000 |

|     | MBytes | | | | | | | |
| --- | --- | --- | --- | --- | --- | --- | --- | --- |
|     | 544 | 576 | 608 | 640 | 672 | 704 | 736 | 768 |
| K11 | 43FFFF | 47FFFF | 4BFFFF | 4FFFFF | 53FFFF | 57FFFF | 5BFFFF | 5FFFFF |
| K10 | 43FFFE | 47FFFE | 4BFFFE | 4FFFFE | 53FFFE | 57FFFE | 5BFFFE | 5FFFFE |
| K9  | 43FFFB | 47FFFB | 4BFFFB | 4FFFFB | 53FFFA | 57FFFA | 5BFFFA | 5FFFFA |
| K8  | 43FFEF | 47FFEE | 4BFFED | 4FFFEC | 53FFEB | 57FFEA | 5BFFE9 | 5FFFE8 |
| K7  | 43FFBC | 47FFB8 | 4BFFB4 | 4FFF80 | 53FFAC | 57FFA8 | 5BFFA4 | 5FFFA0 |
| K6  | 43FEF0 | 47FEE0 | 4BFED0 | 4FFEC0 | 53FEB0 | 57FEA0 | 5BFE90 | 5FFE80 |
| K5  | 43FBCO | 47FB80 | 4BFB40 | 4FFB00 | 53FAC0 | 57FA80 | 5BFA40 | 5FFA00 |
| K4  | 43EF00 | 47EE00 | 4BED00 | 4FEC00 | 53EB00 | 57EA00 | 5BE900 | 5FE800 |
| K3  | 43BC00 | 47B800 | 4BB400 | 4FB000 | 53AC00 | 57A800 | 5BA400 | 5FA000 |
| K2  | 43BC00 | 47B800 | 4BB400 | 4FB000 | 53AC00 | 57A800 | 5BA400 | 5FA000 |
| K1  | 3FC000 | 438000 | 474000 | 4B0000 | 4EC000 | 528000 | 564000 | 5A0000 |
| K0  | 330000 | 360000 | 390000 | 3C0000 | 3F0000 | 420000 | 450000 | 480000 |

The remap 106 indexes all available addresses, e.g., all addresses handled by the channel control system 100 (see FIG. 1). As a simple example, in a system including three channels with eight addresses each and twenty-four addresses, address locations in the channels would be remapped as shown:

| Index in Channel | Channel 0 | Channel 1 | Channel 2 |
| --- | --- | --- | --- |
| 0 | 0  | 1  | 2  |
| 1 | 6  | 4  | 5  |
| 2 | 9  | 10 | 8  |
| 3 | 12 | 13 | 14 |
| 4 | 18 | 16 | 17 |
| 5 | 21 | 22 | 20 |
| 6 | 3  | 7  | 11 |
| 7 | 15 | 19 | 23 |

Although the processes in FIGS. 2, 3, 4, 6, and 7 are each described with reference to the elements included in the example channel control system 100 of FIG. 1, these or similar processes, each including the same, more, or fewer elements, reorganized or not, may be performed in the channel control system 100 or in another, similar system. Additionally, the processes in FIGS. 2, 3, 4, 6, and 7 are described systems using 128-byte interleaving and including three channels and thirty-one bit addresses, but the processes may be used (with any appropriate modifications) for any size interleaving, for any number of channels, and for addresses of any size. Furthermore, the processes in FIGS. 2, 3, 4, 6, and 7 need not all be performed together in the same system but may find applicability alone or in partial combination with two or more of the other processes.

Figure 8:
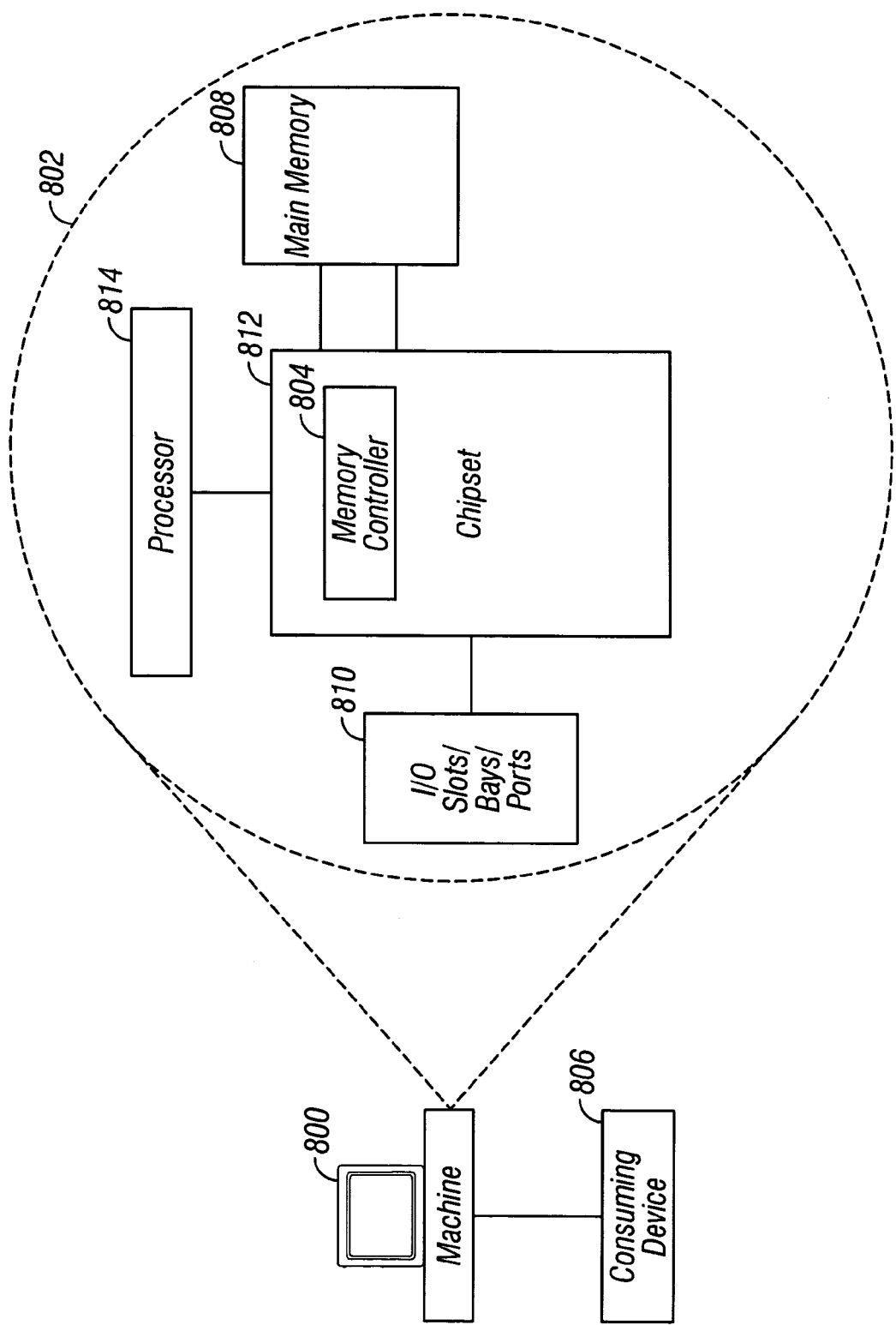
FIG. 8 is a block diagram of an example machine system.

Referring to FIG. 8, a machine 800 includes a processing system 802 including a memory controller 804 that may include or be configured similar to the channel control system 100 (see FIG. 100). The elements described with reference to FIG. 8 can be implemented in a variety of ways.

A consuming device 806 may need information stored at a location in a main memory 808. The consuming device 806 typically connects to the machine 800 via input/output (I/O) ports, bays, and/or slots 810 and requests data from the main memory 808 through a chipset 812 and a processor 814.

The memory controller 804 may control access to and map addresses in the main memory 808 as described above, interleaving reads/writes using multiple memory channels. The main memory 808 can include any memory mechanism capable of storing data. Examples of the main memory 808 include random access memory (RAM) such as dynamic RAM or static RAM, read only memory (ROM), flash memory, tapes, disks, buffers, and other types of similar storage mechanisms. The main memory 808 may include one storage mechanism, e.g., one RAM chip, or any combination of storage mechanisms, e.g., multiple RAM chips. For example, memory may include SDRAM. SDRAM generally refers to a type of DRAM that can run at much higher clock speeds than conventional memory. SDRAM can synchronize itself with a bus associated with a processor included in the computing system (e.g., the processor 814). DDR-SDRAM generally refers to a type of SDRAM that supports data transfers on both edges of each clock cycle (the rising and falling edges), effectively doubling the memory's data throughput.

The machine 800 can include any mechanism or device capable of processing data. Examples of the machine 800 include workstations, stationary personal computers, mobile personal computers, servers, personal digital assistants, pagers, telephones, and other similar mechanisms and devices.

The consuming device 806 can include an I/O device, network interface, or other mechanism that may communicate with or be included in the machine 800. I/O devices generally include devices used to transfer data into and/or out of a computer system. Examples of I/O devices include mice, keyboards, printers, display devices such as monitors, disk drives, graphics devices, joysticks, paddles, zip drives, scanners, CD drives, DVD drives, modems, cameras, video devices, microphones, and other similar types of internal, external, and internal/external devices. One consuming device is shown but the machine 800 may communicate with more than consuming device.

The I/O ports, bays, and/or slots 810 may include any mechanisms or interfaces capable of connecting one or more consuming devices to the machine 800. For example, the I/O ports, bays, and/or slots 810 may include peripheral component interconnect (PCI) slots, parallel ports, serial bus ports, disk drive bays, and other similar types of mechanisms and interfaces.

The processor 814 can include any processing mechanism such as a microprocessor or a central processing unit (CPU). The processor 814 may include one or more individual processors. The processor 814 may include a network processor, a general purpose embedded processor, or other similar type of processor.

The chipset 812 can include any number of chips/integrated circuits that can provide interfaces between the machine's subsystems.

Instructions and data are typically communicated to and from the main memory 808 in blocks. A block generally refers to a collection of bits or bytes communicated or processed as a group. A block may include any number of words, and a word may include any number of bits or bytes.

Data can be communicated between elements on communication links. The communication links can include any kind and any combination of communication links such as buses (of any type and size), physical ports, wireless links, and other similar links. For bus communication links, the buses can have any width, e.g., sixteen bits, thirty-two bits, sixty-four bits, etc., and may run at any speed, e.g., thirty-three Mega Hertz (MHz), 100 MHz, etc. A bus may have a sideband feature in which the bus includes parallel channels that can each simultaneously carry data and/or address information. Additionally, each of the communication links may include one or more individual communication links.

The memory controller 804 generally includes any mechanism capable of communicating with and managing the main memory 808. The memory controller 804 may include one or more chips and may be included in the chipset 812 or may be a mechanism independent from the chipset 812. The memory controller 804 may include any number of and any type of instructions, routines, applications, and/or programs.

Furthermore, the machine 800 is simplified for ease of explanation. The machine 800 may include more or fewer additional elements such as communication links, processors, storage mechanisms (buffers, caches, memories, databases, etc.), display mechanisms, consuming devices, bridges, chips, and other similar types of machine elements.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile computers, stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
    receiving an address corresponding to a memory having a non power of two number, X, of associated channels to the memory;
    determining one or more of the channels to use in accessing the memory, the determining comprising applying a modulo-X based reduction to the address; and
    indexing the address for a determined channel;
    wherein the receiving comprises receiving a first address and a count, the method further comprising calculating a second address from the first address and the count, and the determining comprises applying the modulo-X based reduction to the first and second addresses to map the first and second addresses to the channels, wherein a single one of the channels is determined to be used in accessing the memory in response to receiving the first address if both the first and second addresses map to the single one of the channels.

2. The method of claim 1, wherein the applying the modulo-X based reduction to the address comprises including a channel number as input to the modulo-X based reduction.

3. A method comprising:
    receiving an address corresponding to a memory having a non power of two number, X, of associated channels to the memory;
    determining one or more of the channels to use in accessing the memory, the determining comprising applying a modulo-X based reduction to the address; and
    indexing the address for a determined channel;
    wherein the indexing comprises:
        determining a longest string of consecutive bits having a value of one in the address;
        dropping the longest string from the address;
        justifying remaining bits in the address; and filling vacated bits in the address with ones to create a remapped address for the determined channel.

4. The method of claim 3, wherein the determined channel has a non power of two number of corresponding memory locations, and the filling comprises filling the vacated bits in the address based on one or more lookup tables including constants that indicate start addresses for address filling.

5. An apparatus comprising:
a non power of two number, X, of channels to a memory; and
a control device configured to receive an address corresponding to the memory and determine one or more of the channels to use in accessing the memory by applying a modulo-X based reduction to the address;
wherein the address comprises a first address, the control device configured to receive the first address and a count, calculate a second address from the first address and the count, and determine the one or more of the channels by applying the modulo-X based reduction to the first and second addresses to map the first and second addresses to the channels, wherein a single one of the channels is determined to be used in accessing the memory in response to receipt of the first address if both the first and second addresses map to the single one of the channels.

6. The apparatus of claim 5, wherein the applying the modulo-X based reduction to the address comprises including a channel number as input to the modulo-X based reduction.

7. An apparatus comprising:
a non power of two number, X, of channels to a memory; and
a control device configured to receive an address corresponding to the memory and determine one or more of the channels to use in accessing the memory by applying a modulo-X based reduction to the address, the control device configured to determine a longest string of consecutive bits having a value of one in the address, drop the longest string from the address, justify remaining bits in the address, and fill vacated bits in the address with ones to create a remapped address for the determined channel.

8. The apparatus of claim 7, wherein the determined channel has a non power of two number of corresponding memory locations, and the control device configured to fill the vacated bits in the address based on one or more lookup tables including constants that indicate start addresses for address filling.

9. An apparatus comprising:
a non power of two number, X, of channels to a memory; and
a control device configured to receive an address corresponding to the memory and determine one or more of the channels to use in accessing the memory by applying a modulo-X based reduction to the address;
wherein the control device comprises X channel controllers, each of the channel controllers configured to receive the address corresponding to the memory and determine whether an associated channel is to be used in accessing the memory by applying the modulo-X based reduction to the address; and
wherein the address comprises a first address, each of the channel controllers comprises a match detect mechanism and a count remapping mechanism, the match detect mechanism configured to receive the first address and a count, calculate a second address from the first address and the count, and determine whether the associated channel is to be used in accessing the memory by applying the modulo-X based reduction to the first and second addresses, and the count remapping mechanism configured to receive the first address and the count and to remap the count.

10. The apparatus of claim 9, the count remapping mechanism further configured to index a third address within the associated channel.

11. The apparatus of claim 10, the count remapping mechanism configured to determine a longest string of consecutive bits having a value of one in the third address, drop the longest string from the third address, justify remaining bits in the third address, and fill vacated bits in the third address with ones to create a remapped address within the associated channel.

12. The apparatus of claim 11, wherein the associated channel has a non power of two number of corresponding memory locations, and the count remapping mechanism configured to fill the vacated bits in the third address based on one or more lookup tables including constants that indicate start addresses for address filling.

13. A system comprising:
the apparatus of claim 5, 7 or 9; and
the memory comprising a read-write memory.

14. The system of claim 13, wherein the read-write memory comprises a random access memory.

15. The system of claim 13, further comprising multiple additional devices configured to access the read-write memory using the control device.

16. The system of claim 15, wherein the multiple additional devices comprise multiple processors.

* * * * *